(12) United States Patent
Cole et al.

(10) Patent No.: US 12,289,302 B2
(45) Date of Patent: *Apr. 29, 2025

(54) SYSTEMS AND METHODS FOR QUERYING USER CONFIGURATIONS OF COMPUTER SYSTEMS TO AID SELF-SERVICE TROUBLESHOOTING AND SYSTEM OPERATION DIAGNOSTICS

(71) Applicant: Morgan Stanley Services Group Inc., New York, NY (US)

(72) Inventors: Mark Cole, Jersey City, NJ (US); Lee Reynolds, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 18/226,935

(22) Filed: Jul. 27, 2023

(65) Prior Publication Data
US 2023/0370443 A1    Nov. 16, 2023

Related U.S. Application Data

(63) Continuation of application No. 17/144,683, filed on Jan. 8, 2021, now Pat. No. 11,757,860.

(51) Int. Cl.
  *H04L 9/40*  (2022.01)
(52) U.S. Cl.
  CPC ............................ *H04L 63/0807* (2013.01)

(58) Field of Classification Search
  CPC ..... H04L 63/0807; H04L 63/08; H04L 63/083
  See application file for complete search history.

(56) References Cited

U.S. PATENT DOCUMENTS

| | | | |
|---|---|---|---|
| 8,695,075 B2 | 4/2014 | Anderson et al. | |
| 9,348,944 B2 | 5/2016 | Gerhart | |
| 9,716,718 B2 | 7/2017 | Belton et al. | |
| 10,158,637 B1 | 12/2018 | Belton et al. | |
| 10,212,275 B2* | 2/2019 | Lawson | H04W 4/16 |
| 10,585,682 B2 | 3/2020 | Jain et al. | |
| 10,680,905 B1 | 6/2020 | Kim et al. | |
| 2005/0172170 A1 | 8/2005 | Thieret et al. | |
| 2011/0275364 A1* | 11/2011 | Austin | H04W 4/029 455/423 |
| 2012/0303802 A1 | 11/2012 | Sullivan | |
| 2020/0145299 A1* | 5/2020 | Do | G06F 9/45558 |

OTHER PUBLICATIONS

Samreen, Faiza. "A Transfer Learning-Aided Decision Support System for Multi-Cloud Brokers." Order No. 11018509 Lancaster University (United Kingdom), 2017. (Year: 2017).*

* cited by examiner

*Primary Examiner* — Amber A Misiaszek
(74) *Attorney, Agent, or Firm* — K&L Gates LLP (57) ABSTRACT

Computer-implemented systems and methods provide a better support experience and resolve user configuration issues for firm platforms more quickly. The systems and methods use automated tools that query a selected firm platform for real time data that allows anyone to obtain an up-to-date view of a user's data or configuration for the selected platform.

12 Claims, 5 Drawing Sheets

```
Results
----------------------------------------
General information for Doe, John (DJV) (John.Doe@example.com) at 01/07/2021 11:26:40
----------------------------------------
Display Name: Doe, John (DJV)
Exchange version: 0.20 (15.0.0.0) [Exchange Online]
Legacy Exchange DN: /o=ExchangeLabs/ou=Exchange Administrative Group (FYDIBOHF23SPDLT)/cn=Recipients/cn=24151737472csdff9241abg1k44975893
Distinguished Name: CN=doejohn,OU=IT,OU=NY,OU=USA,DC=example,DC=com
Exchange GUID: 1c646467e3-46ff-575744-a5aa-cb6ac43a862d
Password last reset: 11/10/2020 13:55:02
SMTP Email address: john.doe@example.com
altSecurityIdentities: kerberos:john.doe@kerb.example.com
mailbox link status: not linked
----------------------------------------
Exchange Online Configuration
----------------------------------------
[Pass] user has an example.mail.onmicrosoft.com email address in Exchange
[Pass] OnPrem mailbox object has mailDrop (doejohn@newyork.example.com).
[    ] user has an Gmail alternative recipient set.
[Pass] user is a member of group O365-lic-ExchangeOnline
[Fail] user is not a member of group O365-lic-Office365ProPlus
[Pass] user is not a member of a BIG group.
```

SYSTEMS AND METHODS FOR QUERYING USER CONFIGURATIONS OF COMPUTER SYSTEMS TO AID SELF-SERVICE TROUBLESHOOTING AND SYSTEM OPERATION DIAGNOSTICS

PRIORITY CLAIM

The present application claims priority as a continuation of U.S. patent application Ser. No. 17/144,683, filed Jan. 8, 2021.

BACKGROUND

Users in large firms and organizations use, every day, many on-premises and/or cloud-based computer platforms, such as email, instant messaging, and conferencing platforms, among others. Any user configuration issues with these platforms can impact a user's daily work, potentially to the detriment of the firm. The firm's computer platforms (whether on premises or cloud-based) are usually protected by various controls and permissions to protect the platforms, and only a very small set of people, such as help desk personnel and/or other IT support staff, have access to this configuration data. Because of this bottleneck, identifying and resolving user configuration issues can be inefficient, time consuming, and/or cumbersome.

SUMMARY

In one general aspect, the present invention is directed to computer-implemented systems and methods that provide a better support experience and resolve user configuration issues for firm platforms more quickly. The systems and methods use automated tools that query a selected firm platform for real time data that allows anyone to obtain an up-to-date view of a user's data or configuration for the selected platform. This is particularly valuable to IT support teams for a firm, for example, to rapidly see issues without needing special access to the platforms. As a result, the IT support term personnel do not need to place time-consuming tickets to the platform's support teams and can self-identify and resolve issues more quickly.

In one general aspect, a computer system according to the present invention comprises a first on-premises computer platform (e.g., an email platform) of the firm and a first external computer platform (e.g., a cloud-based conferencing platform) of the firm. The computer system also comprises a diagnostic computer system that is communication with the first on-premises computer platform and the first external computer platform. The diagnostic computer system comprises a first on-premises computer platform diagnostic module for checking a user configuration for the target user for the first on-premises computer platform; and a first external computer platform diagnostic module for checking a user configuration for the target user for the first external computer platform. The diagnostic computer system also comprises a web server that is in communication with the diagnostic modules. In a first session, when a user configuration for the first on-premises computer platform is check, the web server is for: receiving, from the operator via a webpage, at least one parameter value for a user configuration check for the target user for the first on-premises computer platform; passing the at least one parameter value to the first on-premises computer platform diagnostic module; and sending a result from the user configuration check for the target user for the first on-premises computer platform by the first on-premises computer platform diagnostic module to the operator via a webpage. In a second session, when a user configuration for the first external computer platform is checked, the web server is for: receiving, from the operator via a webpage, at least one parameter value for a user configuration check for the target user for the first external computer platform; passing the at least one parameter value to the first external computer platform diagnostic module; and sending a result from the user configuration check for the target user for the first external computer platform by the first external computer platform diagnostic module to the operator via a webpage. Also, the first on-premises computer platform diagnostic module can use a first system account for authenticating with the first on-premises computer platform to collect data about the target user with the first on-premises computer platform; and the first external computer platform diagnostic module can uses a second system account for authenticating with the first external computer platform to collect data about the target user with the first external computer platform. That way, the diagnostic computer system does not need to know the authentication credentials for the target user whose user configurations are being checked.

The scripts of the diagnostic modules can define the sets of data and checks to be performed for its associated system platform. Because of checks are automated in scripts, there is less risk that a human makes an error while manually performing commands on a system. For example, there is no keystroke error risk because a standard set of approved and known commands, as defined by the scripts of the modules, is used. Also, because the checks are performed automatically, other issues that may have been missed can be exposed to the operator.

The approach allows data that is otherwise hidden behind access controls to be retrieved in a controlled way for the purpose of troubleshooting. A set of standardized tests and checks are can be defined in the scripts that easily and quickly determine if the user configuration is correct in a repeatable way without the operator having any knowledge of the system in question. By defining this logic in the script, the operator can quickly and easily react to changes to the platform (new versions, updated standard etc.) and apply to other platform (e.g., adding a new tool for Zoom that is different from one used in Skype). Exposing this data in web interface also allows queries to come from a range of clients, including mobile and desktop devices, where otherwise a system specific set of tools would be required. Also, the data can be exposed in a machine friendly way (such as a JSON file). This data can then be used by other systems, teams and processes which would otherwise be impossible.

These and other benefits that can be realized with embodiments of the present invention will be apparent from the description that follows.

FIGURES

Various embodiments of the present invention are described herein by way of example in conjunction with the following figures.

FIG. 3 is a diagram of a results webpage interface that can be provided by the HTML server of FIG. 1 to an operator according to various embodiments of the present invention.

DESCRIPTION

Figure 1:
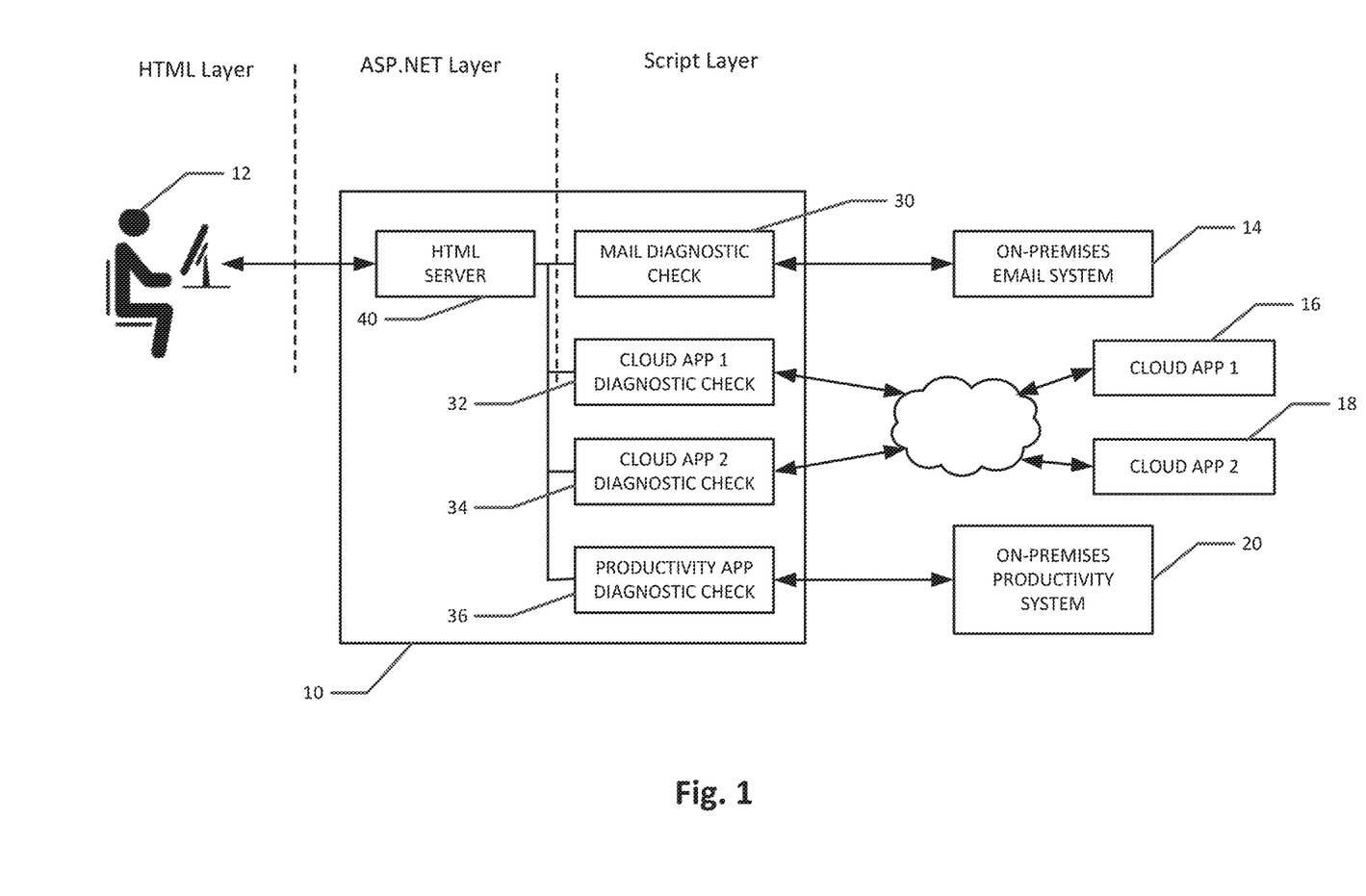
FIG. 1 is a diagram of a firm computer system according to various embodiments of the present invention.
Figure 5:
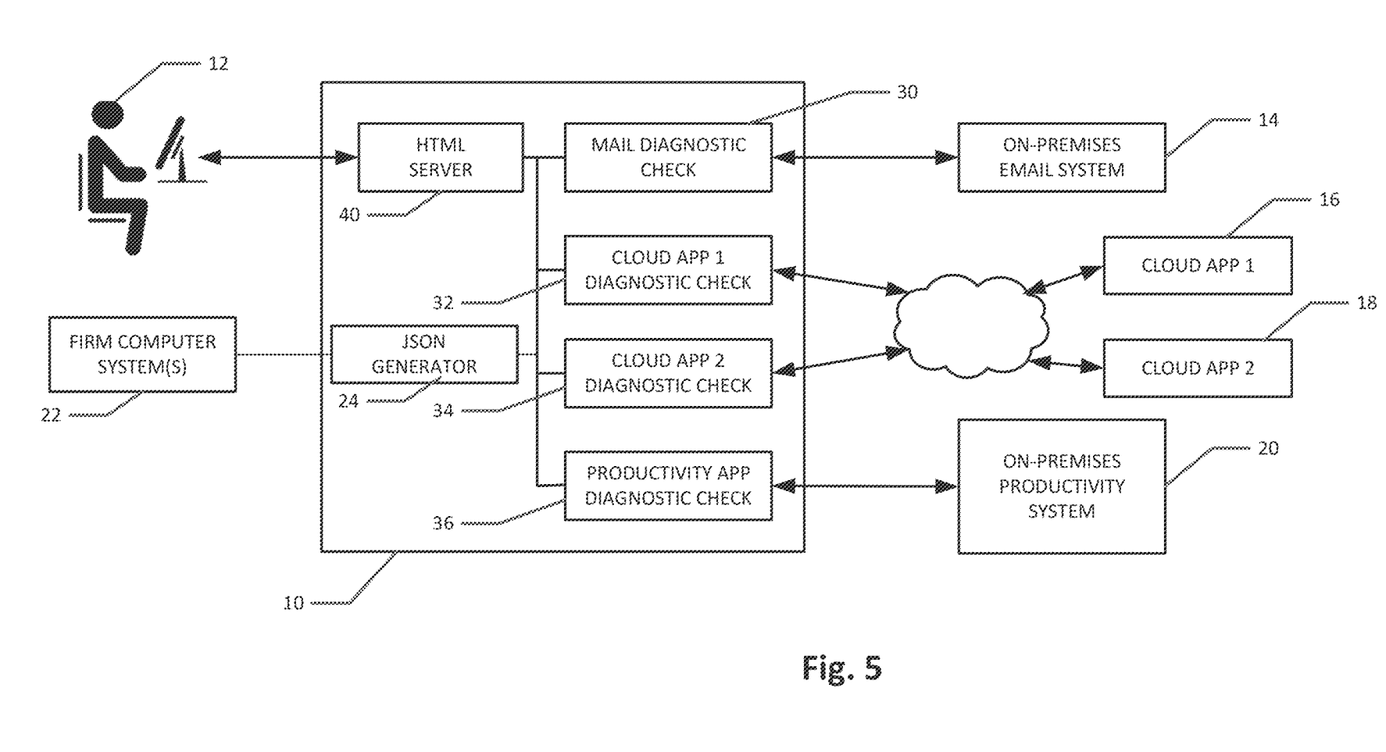
FIG. 5 is a diagram of a firm computer system according to other embodiments of the present invention.

With reference to FIG. 1, in one general aspect, the present invention is directed to a diagnostic computer system 10 for a firm that allows an operator 12 to check a user configuration for a user of the firm for various computer platforms 14, 16, 18, 20 of the firm. The operator could check his/her own configuration(s) or the operator could check the user configuration(s) for another user in the firm. In the case of the operator 12 checking the configuration for another user, the operator 12 could be, for example, a member of the help desk support staff or other IT support staff member of the firm that is tasked with resolving computer and IT issues for firm personnel so that the firm personnel can perform their job functions for the firm more efficiently and productively. In addition to the user configurations, the diagnostic computer system 10 can check the status or current state of the various computer platforms 14, 16, 18, 20. The results from the user configurations and system state checks can be text-based for easy consumption by the operator 12. As shown in FIG. 5, the results can also be machine-readable, such as in a data-exchange format, such as JSON or XML files, for consumption by other computer systems 22 of the firm that might need such information. The term "firm" is used herein to refer to any company, organization, institute, business concern, enterprise, educational facility, etc. that has personnel that utilize computer platforms of the firm in order to perform their job functions.

The illustrated firm computer platforms in FIG. 1 comprise, as illustrative examples, an on-premises email system 14, two cloud based applications 16, 18, and an on-premises productivity system 20. The on-premises email system 14 could be, for example, a Microsoft Exchange email system or another email system used by the firm. The cloud-based applications 16, 18 could be cloud-based telecommunications applications, such as Skype and/or Zoom, or some other cloud-based application that is utilized by personnel of the firm. The productivity system 20 could be, for example, a computer system that provides word-processing, spreadsheet, and other productivity tools for firm personnel. The productivity system 20 could be, for example, a Microsoft Office 365 system. Each of the platforms 14-20 illustrated in FIG. 1 could be implemented with one or more servers. Also, the four platforms 14-20 shown in FIG. 1 are shown for illustrative purposes. The diagnostic computer system 10 could be scaled to perform diagnostics for any desired number—and different types—of platforms as dictated by the needs of the firm. The on-premises email system 14 and the on-premises productivity system 20 can be considered "on-premises" platforms of the firm because they are part of the firm's computer networks. The cloud-based applications 16, 18 can be considered "external" platforms of the firm because they are external to the firm's computer networks (e.g., on the cloud).

The diagnostic system 10 can have a separate software-based diagnostic module for each system platform 14-20. The data and configurations to be checked by each diagnostic module can be tailored to perform the appropriate diagnostic checks for the specific platform 14-20 of the firm. In the example of FIG. 1, therefore, the diagnostic system 10 incudes a mail diagnostic check module 30 for running diagnostic checks on the on-premises email system 14; two cloud app diagnostic check modules 32, 34 for running diagnostic checks on each of the cloud apps 16, 18 respectively; and a productivity app diagnostic check module 36 for running diagnostic checks on the first productivity system 30. A subject matter expert(s) can determine the nature, number and content of the diagnostic checks that are to be conducted for each of the system platforms 14-20. Correspondingly, the software of the diagnostic check modules 30-36 can be written to perform the desired diagnostic checks. The diagnostic system 10 also comprises a HTML (e.g., web) server 40 for receiving and sending responses to HTML (webpage)-based requests from the user 12 for user configurations and/or state checks of the systems 14-20.

In various embodiments, the diagnostic system 10 can be viewed as providing three layers; a frontend web page (e.g., HTML) layer; an ASP.NET layer; and a script layer (e.g., PowerShell script layer). The frontend web page layer can be implemented with the webpage displayed by the browser on the operator's computer 12. In that connection, the HTML server 40 can serve HTML webpages to the operator's computer 12 that are displayed by a browser of the operator's computer 12. In various embodiments, the frontend web page layer can handle all the click button events, inputs, etc., from the webpage(s) on the operator's browser and pass all the webpage parameter values from the webpages to the ASP.NET layer using Ajax (Asynchronous JavaScript and XML), for example.

The ASP.NET layer acts as a bridge between the webpage and the script layers. In that connection, the HTML server 40 preferably comprises a Microsoft Internet Information Services platform running ASP.net. ASP.NET, which is an open-source, server-side web-application framework designed to produce dynamic webpages. ASP.NET is built on a Common Language Runtime (CLR), allowing programmers to write ASP.NET code using any supported .NET language. The HTML server 40 (implementing the ASP.NET layer) receives all of the values from the webpages and then starts the appropriate script (e.g., PowerShell) instance. For example, the HTML server 40 can call the appropriate module 30, 32, 34, 36 (depending on the platform for which the diagnostic check is being made) and pass all of the values from the webpage to the script for the module. Thus, in various embodiments, the ASP.NET layer does not query anything from a production environment of the firm, but instead can just proxy the webpage inputs to the backend modules 30-36.

The script layer can be implemented by the diagnostic check modules 30-36. In various embodiments, the modules may use PowerShell scripts. PowerShell is a task automation and configuration management framework from Microsoft, consisting of a command-line shell and the associated scripting language. The modules 30-36 can be built on a .NET core, which is a managed computer software framework for Windows, Linux and macOS operating systems. The code of the modules 30-36 contains the business logic, respectively, for implementing the desired diagnostic checks for the platforms. The output of this layer (e.g., the results from the diagnostic check on one of the platforms) is returned, in various embodiments, to the HTML server 40 for display on a webpage for the operator.

Preferably, the modules 30-36 use a system account (e.g., a Production ID ("proid"), i.e., an account of a non-human user) for communication with the respective platforms. That way, the operator does not need to use the authentication credentials of the user (or the authentication credentials of the operator) to check the user's configurations with the platforms. In various embodiments, for some platforms, such as the email system 14, the system account is set up to have privileges with the platform. If Kerberos authentication is used for authentication with the platform, then the system account can use Kerberos authentication to authenticate the corresponding diagnostic check module with the platform without saving any plain text password locally (e.g., to the diagnostic computer system). For such embodiments, the proid should be reset when the credentials for the system account are changed. For other platforms, such as some remote/external platforms, for example, the system account (proid) credentials for these remote/external platforms are preferably saved in a Secure Credential Vault which the proid has rights to access and use to connect to the platform. That way, in various embodiments, no unencrypted credentials for the platforms are stored as plain text by the diagnostic computer system 10. In various embodiments, the modules 30-36 use different system accounts as each account has access only to one platform system. That is, the mail diagnostic check module 30 uses a different set of system accounts than the other modules 32-36; the cloud app 1 diagnostic check module 32 uses a different set of system accounts than the other modules 30, 34-36; and so on.

Kerberos is a computer-network authentication protocol that works on the basis of tickets to allow nodes communicating over a non-secure network to prove their identity to one another in a secure manner. In the context of FIG. 1, the modules 30-36 of the diagnostic computer system 10 can use Kerberos authentication to prove their identity to their associated platform 14-20. Kerberos authentication commonly employs an authentication server. As described above, the authentication credentials for the user for whom the user configuration check is being made are not used; instead the module 30-36 can use the authentication credentials for system accounts (i.e., non-human-user accounts). As such, in various embodiments, the module authenticates itself to the authentication server, which forwards the username for the system account (not the user for whom the user configuration check is being made) to a key distribution center (KDC). The KDC issues a ticket-granting ticket (TGT), which is time stamped and encrypts it using the ticket-granting service's (TGS) secret key and returns the encrypted result to the module. The module sends the TGT to the TGS. After verifying that the TGT is valid and that the module is permitted to access the requested platform, the TGS issues ticket and session keys to the module. The module then sends the ticket to the platform along with its diagnostic requests. More details about Kerberos authentication can be found in RFC 4120, RFC 3244 and RFC 4757. In other embodiments, other authentication protocols can be used by the module 30-36.

Figure 2:
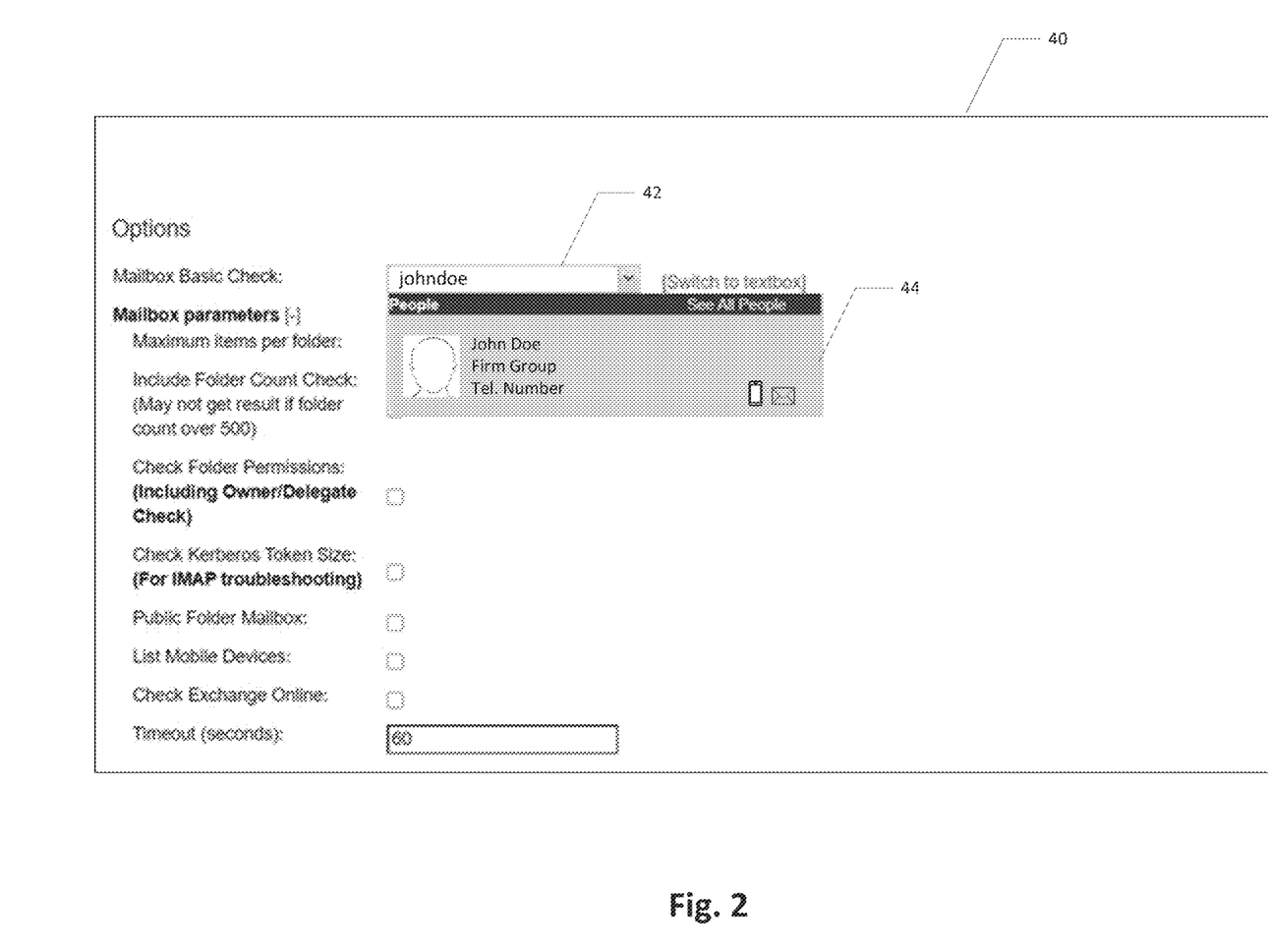
FIG. 2 is a diagram of a webpage interface that can be provided by the HTML, server of FIG. 1 to an operator according to various embodiments of the present invention.

FIG. 2 is an example webpage that a operator could use to check the status of a firm user (e.g., a "target") with the on-premises email system 14 and FIG. 3 is an example of the results that the diagnostic computer system 10 can serve to the operator in a webpage. As shown in FIG. 2, the email diagnostic check webpage 40 includes a search criteria field 42 where the operator can enter the name or ID, or other relevant search criteria, of the target for whom the diagnostic check is to be performed. A search results field 44 can show all of the firm users that match the search criteria so that the user can select the appropriate target. In various embodiments, non-human target users could be available for selection, such as when status checks for a particular server or platform is checked as described herein.

The operator webpage interface, as shown in the example of FIG. 2, can list some or all of the diagnostic checks that can be performed by the mail diagnostic check module 30 and provide the operator with the ability to select some or all of the listed checks for inclusion in the diagnostic check performed by the module. In this example, some of the items that the mail diagnostic check module 30 can check (or ascertain) include: the maximum number of items in an email folder for the target; the number of email folders that the target has; folder permissions for the target (e.g., specific users or groups that are granted or restricted access to folders); authentication (e.g., Kerberos) token size; public folder mail box; a list of mobile devices the target uses to access the on-premises email system 14; and check the target's online email configuration. The operator can have the option of selecting which of these checks to perform by selecting the checkbox corresponding to each listed check option. Note that the search results field 44 occludes the checkboxes for the first two checks listed in FIG. 2. The module 30 can also perform other diagnostic checks automatically (i.e., the operator does not have the option of selecting or deselecting the test). Also, depending on the firm, the firm could have a different number of checks for the email system and/or different qualitative checks than what is shown in the example of FIGS. 2 and 3. As shown in FIG. 2, the operator could also specify a time (in seconds) after which the diagnostic check times out. Also, the nature and number of checks for the other platforms are preferably tailored for those platforms.

FIG. 3 shows an example of the results for the mail diagnostic check of FIG. 2. These results can be provided in a webpage to the operator 12 by the HTML, server 40 after execution of PowerShell script of the mail diagnostic check module 30. As shown in the example of FIG. 3, the results of the mail diagnostic check can include: a timestamp 52 for when the check was performed; an identification 54 of the version of the email system that the target has; the date 56 that the target last reset his/her password for the email system; alternate security identities 58 for the target; etc.

The lower portion of FIG. 3 shows exemplary results of the target's email system online configuration. This example shows several checks that are passed for the target (marked "Pass"); one check that warrants a warning (marked "Warn"); and one check that is failed (marked "Fail"). The Pass, Warn and Fail tags can also be color-coded (e.g., green, yellow, red) to enhance the rapid understanding of the situation by the operator. Listing the results of these checks in such a clear manner allows the user to efficiently diagnose possible problems with the target's configuration, which can facilitate the user's ability to respond to help requests for the target. For example, instead of checking each of these configuration issues one-by-one in response to a request to check issues with the target's configuration, the diagnostic system 10 performs all of the programmed checks at once so that the user can get a rapid, overall, real-time view of the target's configuration.

Figure 4:
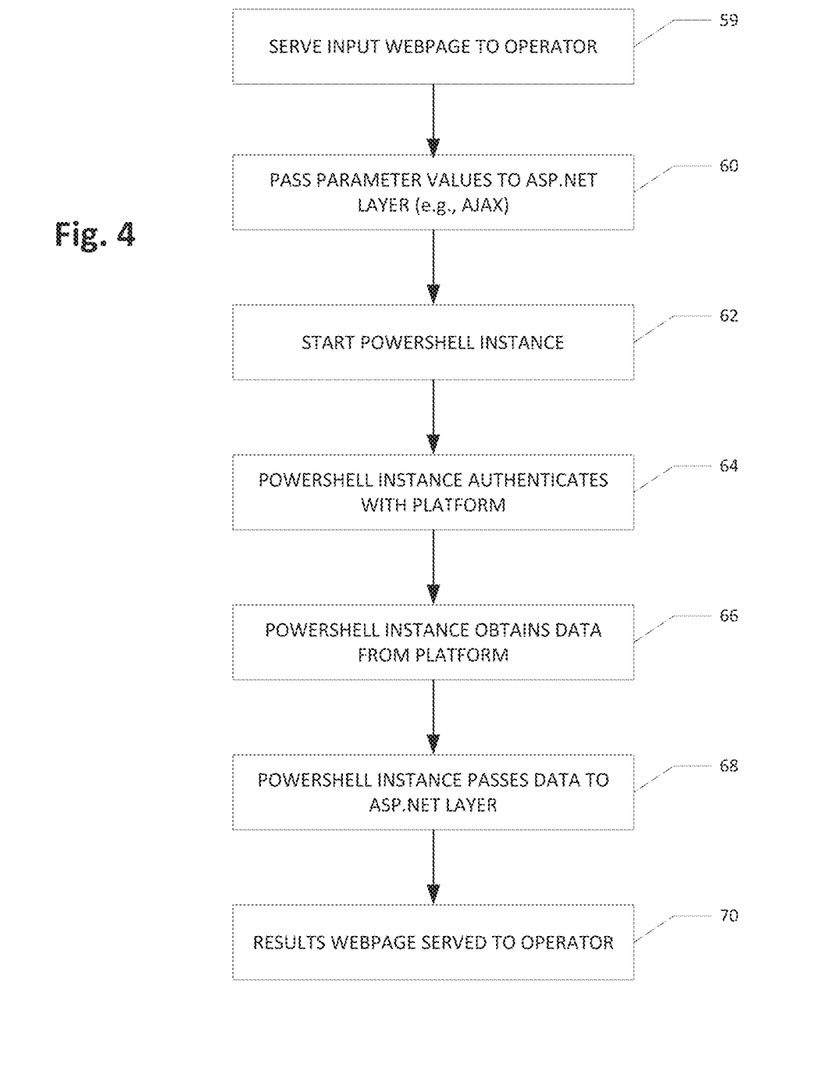
FIG. 4 is a flowchart depicting a process flow of method performed by the system of FIG. 1 according to various embodiments of the present invention.

FIG. 4 is a flow chart illustrating a process that the diagnostic computer system 10 performs according to various embodiments of the present invention. At step 59, the HTML server 40 serves a webpage to the operator for the type user configuration check to be performed. For example, if the operator selects the email user configuration check, the HTML server 40 serves the input webpage for the email user configuration check; if the operator selects the user configuration check for cloud app 1, the HTML server 40 serves the input webpage for cloud app 1; and so on. At step 60, the parameters input by the operator to the input webpage are passed to the HTML server 40 at the ASP.NET layer using Ajax, for example. At step 62, the ASP.NET layer starts a PowerShell instance for the appropriate diagnostic check module 30-36. At step 64, the PowerShell instance authenticates with the platform 14-20. At step 66, the authenticated diagnostic module 30-36 automatically collects the data from its associated platform pursuant to the scripts of the module. At step 68, the PowerShell instance for the module passes the collected data to the HTML server 40, which, at step 70, serves the results on a results webpage to the operator.

In the above described embodiments, the operator 12 checked a configuration for a firm user. In other embodiments, alternatively or additionally, the diagnostic system 10 checks the status of the platforms 14-20, rather that a firm user's configuration with the platform. In such an embodiment, the operator at the HTML can opt to make a platform configuration status check. In that case, the modules 30-36 also comprise scripts to capture the desired data from the platforms and the ASP.NET layer can pass the parameter values from the operator's inputs at the HTML layer to the appropriate PowerShell instance. Again, system accounts can be used to interface with the platform as opposed to a user account.

In other embodiments, rather than providing the results from the checks to the operator on the HTML layer, the diagnostic computer system 10 can provide the results from the checks to a computer system 22 of the firm that uses or monitors the data about the platforms 14-20. In such an embodiment, the diagnostic computer 10 may comprise a JSON generator module 24 that converts that the data collected by the modules 30-36 to JSON (JavaScript Object Notation) or some other data-exchange format (e.g., XML) suitable for consumption by the firm computer system 22. In such embodiments, the operator 12 can specify the platform to be checked and the checks to be made on the HTML layer, just like when the status of one of the platforms is check, but instead input that the results are to be sent by the diagnostic computer system 10 to the firm computer system 22 in the desired format (e.g., JSON or XML).

The diagnostic computer system 10 may be implemented by one or a number of internetworked computers, such as servers. The software for the modules 30-36, the HTML server 40, the JSON generator 24, and other computer functions described herein may be implemented in computer software using any suitable computer programming language, such as PowerShell, .NET, C, C++, or Python, and using conventional, functional, or object-oriented techniques. For example, the diagnostic computer system 10 may be implemented with software modules (i.e., the modules 30-36) stored or otherwise maintained in computer readable media, e.g., RAM, ROM, secondary storage, etc. One or more processing cores (e.g., CPU or GPU cores) of the diagnostic computer system 10 may then execute the software modules to implement the functions provided by the module. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

The diagnostic computer system 10 can be in communication with the platforms via appropriate data networks, such as LANs, WANs, the Internet, etc.

In one general aspect, therefore, the present invention is directed to computer systems and computer-implemented methods for checking a configuration for a target user of a firm. In various embodiments the computer system comprises a first on-premises computer platform (e.g., email platform) of the firm and a first external (e.g., cloud-based) computer platform of the firm. The computer system also comprises a diagnostic computer system that is communication with the first on-premises computer platform and the first external computer platform. The diagnostic computer system comprises: (i) a first on-premises computer platform diagnostic module for checking a user configuration for the target user for the first on-premises computer platform; (ii) a first external computer platform diagnostic module for checking a user configuration for the target user for the first external computer platform; and (iii) a web server that is in communication with the first on-premises computer platform diagnostic module and the first external computer platform diagnostic module. The web server is configured for serving webpages to an operator. In a first session, the web server is configured to receive, from the operator via a webpage, at least one parameter value for a user configuration check for the target user for the first on-premises computer platform; pass the at least one parameter value to the first on-premises computer platform diagnostic module; and send a result from the user configuration check for the target user for the first on-premises computer platform by the first on-premises computer platform diagnostic module to the operator via a webpage.

In a second session, the web server is configured to receive, from the operator via a webpage, at least one parameter value for a user configuration check for the target user for the first external computer platform; pass the at least one parameter value to the first external computer platform diagnostic module; and send a result from the user configuration check for the target user for the first external computer platform by the first external computer platform diagnostic module to the operator via a webpage.

Also, the first on-premises computer platform diagnostic module can use a first system account for authenticating with the first on-premises computer platform to collect data about the target user with the first on-premises computer platform. Similarly, the first external computer platform diagnostic module can use a second system account for authenticating with the first external computer platform to collect data about the target user with the first external computer platform.

In various implementations, authentication credentials for the first system account and authentication credentials for the second system account are not stored as a plain text by the diagnostic computer system. Also, the diagnostic computer system may further comprise a data-exchange format generator for converting output from the first on-premises computer platform diagnostic module to a data-exchange format.

In various implementations, the first on-premises computer platform diagnostic module is further configured to collect data for a status check of the first on-premises computer platform from the first on-premises computer platform and pass the data for the status check to the web server to serving to the operator on a webpage.

In various implementations, scripts of the first on-premises computer platform diagnostic module and the first external computer platform diagnostic module comprise PowerShell scripts. Also, the web server can comprise a Microsoft Internet Information Services platform running ASP.net.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for checking a status of a computer platform of a firm, the computer system comprising:
 a first on-premises computer platform of the firm;
 a first external computer platform of the firm;
 a diagnostic computer system that is communication with the first on-premises computer platform and the first external computer platform, wherein the diagnostic computer system comprises:
  one or more processing cores that is configured to:
   check a status for the first on-premises computer platform; and
   check a status for the first external computer platform; and
  a web server that is in communication with the one or more processing cores, wherein the web server is for:
   serving webpages to an operator;
   in a first session:
    receiving, from the operator via a webpage, at least one parameter value for a status check for the first on-premises computer platform;
    passing the at least one parameter value to the one or more processing cores; and
    sending a result from the status check for the first on-premises computer platform by the one or more processing cores to the operator via a webpage; and
   in a second session:
    receiving, from the operator via a webpage, at least one parameter value for a status check for the first external computer platform;
    passing the at least one parameter value to the one or more processing cores; and
    sending a result from the status check for the first external computer platform by the one or more processing cores to the operator via a webpage,
  wherein:
   the status check for the first on-premises computer platform by the one or more processing cores uses a first system account for authenticating with the first on-premises computer platform to collect status data about the first on-premises computer platform; and
   the status check for the first external computer platform by the one or more processing cores uses a second system account for authenticating with the first external computer platform to collect status data about the first external computer platform.

2. The computer system of claim 1, wherein authentication credentials for the first system account and authentication credentials for the second system account are not stored as a plain text by the diagnostic computer system.

3. The computer system of claim 1, wherein:
 the first on-premises computer platform comprises a on-premises email platform; and
 the first external computer platform comprises a cloud-based platform.

4. The computer system of claim 3, wherein the cloud-based platform comprises a cloud-based conferencing platform.

5. The computer system of claim 1, wherein the diagnostic computer system further comprises a data-exchange format generator for converting output from the status check of the first on-premises computer platform to a data-exchange format.

6. The computer system of claim 1, wherein the one or more processing cores of the diagnostic computer system execute scripts to check the status for the first on-premises computer platform and to check the status for the first external computer platform, and wherein the scripts comprise PowerShell scripts.

7. The computer system of claim 6, wherein the web server comprises a Microsoft Internet Information Services platform running ASP.net.

8. A computer-implemented method for checking a status of a computer platform of a firm, the method comprising:
 in a first session:
  receiving, from an operator via a webpage provided by a web server of a diagnostic computer system of the firm, at least one parameter value for a status check for a first on-premises computer platform of the firm;
  passing, by the web server, the at least one parameter value to a first on-premises computer platform diagnostic module of the diagnostic computer system;
  authenticating, by the first on-premises computer platform diagnostic module, with the first on-premises computer platform using a first system account;
  collecting data, by first on-premises computer platform diagnostic module, from the first on-premises computer platform, for the status check for the first on-premises computer platform;
  passing, by first on-premises computer platform diagnostic module, the collected data from the first on-premises computer platform to the web server; and
  sending a result from the status check for the first on-premises computer platform by the first on-premises computer platform diagnostic module to the operator via a webpage; and
 in a first session:
  receiving, from the operator via a webpage provided by the web server, at least one parameter value for a status check for a first external computer platform of the firm;
  passing, by the web server, the at least one parameter value to a first external computer platform diagnostic module of the diagnostic computer system;
  authenticating, by the first external computer platform diagnostic module, with the first external computer platform using a second system account;

collecting data, by first external computer platform diagnostic module, from the first external computer platform, for the status check for the first external computer platform;

passing, by first external computer platform diagnostic module, the collected data from the first external computer platform to the web server; and sending a result from the status check for the first external computer platform by the first external computer platform diagnostic module to the operator via a webpage.

9. The method of claim 8, wherein authentication credentials for the first system account and authentication credentials for the second system account are not stored as a plain text by the diagnostic computer system.

10. The method of claim 8, wherein:

the first on-premises computer platform comprises a on-premises email platform; and the first external computer platform comprises a cloud-based platform.

11. The method of claim 10, wherein the cloud-based platform comprises a cloud-based conferencing platform.

12. The method of claim 8, further comprising converting, by a data-exchange format generator, output from the first on-premises computer platform diagnostic module to a data-exchange format.

\* \* \* \* \*